US011984026B2

(12) United States Patent
Newland et al.

(10) Patent No.: US 11,984,026 B2
(45) Date of Patent: May 14, 2024

(54) SYSTEM AND METHOD FOR EMERGENCY VEHICLE DETECTION AND ALERTING

(71) Applicant: Alert The Mechanism LLC, Aledo, TX (US)

(72) Inventors: David W. Newland, Aledo, TX (US); Shane M. Hopkins, Coppell, TX (US)

(73) Assignee: Alert The Mechanism LLC, Aledo, TX (US)

( * ) Notice: Subject to any disclaimer, the term of this patent is extended or adjusted under 35 U.S.C. 154(b) by 240 days.

(21) Appl. No.: 17/664,191

(22) Filed: May 19, 2022

(65) Prior Publication Data
US 2023/0377459 A1 Nov. 23, 2023

(51) Int. Cl.
*G08G 1/0965* (2006.01)
*B60W 40/04* (2006.01)
(Continued)

(52) U.S. Cl.
CPC .......... *G08G 1/0965* (2013.01); *B60W 40/04* (2013.01); *B60W 50/14* (2013.01); *G06V 10/143* (2022.01);
(Continued)

(58) Field of Classification Search
CPC ...... G08G 1/0965; G08G 1/162; G08G 1/166; G06V 10/143; B60W 40/04; B60W 50/14;
(Continued)

(56) References Cited

U.S. PATENT DOCUMENTS 4,212,085 A * 7/1980 Vaillancour .......... G01S 3/8034
340/902
5,307,060 A 4/1994 Prevulsky et al.
(Continued)

FOREIGN PATENT DOCUMENTS

DE 10060017 A1 6/2002
DE 102010022165 A1 1/2011
(Continued)

OTHER PUBLICATIONS

"Terry, Travis N., and Stephen Tanner. ""Problematic Roadway Environments forAutomated Vehicles."" (2018).https://vtechworks.lib.vt.edu/bitstream/handle/10919/82728/NSTSCE_ProblematicEnvironments_Final.pdf?sequence=1&isAllowed=y".
(Continued)

*Primary Examiner* — Chico A Foxx
(74) *Attorney, Agent, or Firm* — Schultz & Associates, P.C.

(57) ABSTRACT

A system and method is provided for detecting the approach of official and emergency vehicles and alerting drivers. The system is comprised of a vehicle device, a client device, a local device and a dongle. The local device includes a set of acoustic sensors and a set of light wave sensors. The local device is connected to the dongle. The dongle is connected to the local device, the vehicle device and the client device. In use, the sensors record analog light wave and acoustic signals. The signals are processed through a series of rolling frequency and amplitude summary tables to determine the type of emergency vehicle and whether or not it is approaching. If so, an alert is generated and sent to the vehicle device and the client device where it is displayed.

28 Claims, 15 Drawing Sheets

(51) Int. Cl.
  *B60W 50/14* (2020.01)
  *G06V 10/143* (2022.01)
  *G08G 1/16* (2006.01)
  *H04R 1/20* (2006.01)
  *B60W 50/00* (2006.01)

(52) U.S. Cl.
  CPC .............. *G08G 1/162* (2013.01); *G08G 1/166* (2013.01); *H04R 1/20* (2013.01); *B60W 2050/0054* (2013.01); *B60W 2050/143* (2013.01); *B60W 2050/146* (2013.01); *B60W 2420/40* (2013.01); *B60W 2420/54* (2013.01); *H04R 2499/13* (2013.01)

(58) Field of Classification Search
  CPC ... B60W 2050/0054; B60W 2050/143; B60W 2050/146; B60W 2420/40; B60W 2420/54; H04R 1/20; H04R 2499/13
  See application file for complete search history.

(56) References Cited

U.S. PATENT DOCUMENTS

| | | | |
|---|---|---|---|
| 5,495,242 A * | 2/1996 | Kick | G08G 1/087 340/902 |
| 5,495,243 A | 2/1996 | Mckenna | |
| 5,894,279 A | 4/1999 | Rose et al. | |
| 6,094,148 A | 7/2000 | Henry et al. | |
| 6,339,382 B1 | 1/2002 | Arbinger et al. | |
| 6,614,362 B2 | 9/2003 | Siegel | |
| 6,822,580 B2 * | 11/2004 | Ewing | G08G 1/0965 340/901 |
| 7,183,944 B2 * | 2/2007 | Gutta | G08G 1/0965 348/148 |
| 7,616,128 B2 * | 11/2009 | Ohno | G10L 17/26 340/904 |
| 7,675,431 B1 * | 3/2010 | Caouette, Sr. | G08G 1/0965 367/199 |
| 8,094,040 B1 | 1/2012 | Cornett et al. | |
| 9,397,630 B2 * | 7/2016 | Wang | H03G 9/025 |
| 9,751,463 B1 * | 9/2017 | Ramcharitar | G08G 1/052 |
| 10,236,018 B2 | 3/2019 | Moore et al. | |
| 11,164,454 B2 | 11/2021 | Silver et al. | |
| 11,244,564 B2 | 2/2022 | Seifert | |
| 11,364,910 B1 * | 6/2022 | Schmitt | G06F 18/2193 |
| 11,508,240 B2 * | 11/2022 | Raget | G10L 25/51 |
| 11,884,298 B2 * | 1/2024 | Brown | B60W 10/184 |
| 2002/0186201 A1 | 12/2002 | Gutta et al. | |
| 2005/0239436 A1 | 10/2005 | Bell et al. | |
| 2008/0150755 A1 | 6/2008 | Van Zandt et al. | |
| 2010/0228482 A1 * | 9/2010 | Yonak | G01S 7/52001 701/301 |
| 2012/0313792 A1 * | 12/2012 | Behm | G08G 1/0962 340/902 |
| 2013/0049985 A1 * | 2/2013 | Eisenson | G08G 1/0965 340/902 |
| 2015/0365743 A1 * | 12/2015 | Konigsberg | H04R 3/00 381/86 |
| 2016/0193961 A1 | 7/2016 | Fischer et al. | |
| 2016/0231746 A1 | 8/2016 | Hazelton et al. | |
| 2016/0252905 A1 | 9/2016 | Tian et al. | |
| 2018/0233047 A1 * | 8/2018 | Mandeville-Clarke | G01S 13/931 |
| 2019/0027032 A1 * | 1/2019 | Arunachalam | G08G 1/0965 |
| 2019/0283758 A1 * | 9/2019 | Arisa | B60W 30/08 |
| 2019/0294169 A1 | 9/2019 | Shabtai et al. | |
| 2021/0103747 A1 * | 4/2021 | Moustafa | G06F 18/25 |
| 2021/0158701 A1 | 5/2021 | Cho et al. | |
| 2021/0201676 A1 * | 7/2021 | Tariq | B60W 30/18163 |
| 2021/0358300 A1 | 11/2021 | Raget et al. | |
| 2022/0126866 A1 | 4/2022 | Brown et al. | |
| 2022/0157165 A1 * | 5/2022 | Dantrey | G06N 3/047 |
| 2023/0343214 A1 * | 10/2023 | Abbaspour | G06F 18/2415 |

FOREIGN PATENT DOCUMENTS

| | | |
|---|---|---|
| EP | 3128497 A1 | 2/2017 |
| JP | 2015022453 A | 2/2015 |
| WO | 2019219718 A1 | 11/2019 |
| WO | 2021138696 A1 | 7/2021 |

OTHER PUBLICATIONS

"Shirkey, K., G. Mayhew, and B. Casella. ""Invehicle Safety Advisory And WarningSystem (IVSAWS), vol. II."" (1996).https://rosap.ntl.bts.gov/view/dot/2199/dot_2199_DS1.pdf".

"Phule, Harshad. ""Public safety application for approaching emergency vehiclealert and accident reporting in VANETs using WAVE."" (2012).https://scholarworks.rit.edu/cgi/viewcontent.cgi?article=4189&context=theses".

"Sharma, Jyoti, Rakesh Mandliya, and Nilesh Sharma. ""Smart Ambulance andsmart traffic system for traffic management using ARM Processor."" http://intjou.com/PublishedPaper/3Vol/Issue6/3604-bfd1831e-1a77-4211-9c20-c69d44243c1328099.pdf".

"Lee, Michael, and Travis Atkison. ""Vanet applications: Past, present, and future."" Vehicular Communications 28 (2021): 100310. https://www.sciencedirect.com/science/article/abs/pii/S2214209620300814".

"Dandala, Tej Tharang, Vallidevi Krishnamurthy, and Rajan Alwan. ""Internet ofVehicles (IoV) for traffic management."" 2017 International conference oncomputer, communication and signal processing (ICCCSP). IEEE, 2017.http://kresttechnology.com/krest-academic-projects/krest-mtech-projects/IOT/Mech%20IOT-2017-18/IOT%20Basepaper%202017-18/33.%20Internet%20of%20Vehicles%20(IoV)%20for%20traffic%20management.pdf".

"McCann, Connor, Steve Hansen, and Nathan Olivarez. An Interactive QualifyingProject. Diss. Master??? s thesis, Worcester Polytechnic Institute, 2011.https://digital.wpi.edu/downloads/gh93gz800".

A National Perspective on Ambulance Crashes and Safety: Guidance from the National Highway Traffic Safety Administration on ambulance safety for patients, Noah Smith, EMSWORLD.com, Sep. 2015.

Preventing Emergency Vehicle Crashes: Status and Challenges of Human Factors Issues, Hsiao, et al., Nathional Institute for Occupational Safety and Health, Jul. 2, 2018.

\* cited by examiner

SYSTEM AND METHOD FOR EMERGENCY VEHICLE DETECTION AND ALERTING

FIELD OF THE INVENTION

The present invention relates to the detection of emergency lights and sirens of official vehicles and generation of corresponding notification signals to drivers.

BACKGROUND OF THE INVENTION

Warning lightbars and sirens of official vehicles are designed to draw attention and indicate to drivers that they should yield right of way. However, due to various distractions, such as loud music, poor visibility, driver impairment, and other intervening events, drivers may not recognize visual or audible warning signals and so may not realize that an official vehicle is approaching and fail to yield right of way. Without yielding right of way, drivers may block passage of, or collide with, official vehicles causing delay or traffic accidents.

For example, the National Highway Traffic Safety Administration (NHTSA) estimates an average of 4,500 crashes per year involve ambulances. Approximately 34% of these crashes result in injuries. An average of 33 crashes a year result in fatalities. *A National Perspective on Ambulance Crashes and Safety: Guidance from the National Highway Traffic Safety Administration on ambulance safety for patients*, Noah Smith, EMSWORLD.com, September 2015.

NHTSA reports that 559 law enforcement officers were killed in car accidents between 2000 and 2008. Similarly, 179 firefighters, and 97 EMS technicians died in car accidents between 2004 and 2013, and 1993 and 2010, respectively. Between 2004 and 2006 over there were over 27 thousand documented crashes involving law enforcement vehicles. Generally, crashes involving emergency vehicles are less likely when emergency vehicles obtain proper right-of-way. *Preventing Emergency Vehicle Crashes: Status and Challenges of Human Factors Issues*, Hsiao, et al., National Institute for Occupational Safety and Health, Jul. 2, 2018. Hence, a problem exists with driver recognition of warning lights and sirens.

Another problem which exists in recognizing emergency vehicles is that a wide variation of signal types are used to alert oncoming traffic. The wide variation makes recognition of emergency vehicles difficult.

Similarly, it may be difficult for drivers to differentiate between an emergency vehicle siren used as background noise in modern music and an actual emergency vehicle siren. This often results in drivers delayed responses or drivers completely ignoring actual emergency vehicle sirens.

A further difficulty in recognizing emergency vehicles exists for hearing impaired drivers. For example, hearing defects exist which limit the range of acoustic frequencies which can be recognized. Similarly, drivers with color blindness may find recognition of colored lights associated with light bars of emergency vehicles versus non-emergency vehicles, such as construction vehicles, difficult or impossible.

The prior art has attempted to resolve these problems in a number of ways, but has not been successful.

For example, WO 2021/138696 to Buck, et al. discloses a method for detecting the presence of an acoustical siren by monitoring acoustic signals over a period of time. However, Buck does not disclose a method for detecting an emergency vehicle based on light signals.

As another example, U.S. Pat. No. 11,244,564 to Seifert, Heinz discloses a method for detecting the approach of an emergency vehicle and the approach direction using a plurality of cameras and microphones for use with autonomous vehicles using source triangulation. However, Seifert requires multiple microphone placements and does not disclose a method for determining the type of emergency vehicle detected.

As yet another example, U.S. Pat. No. 10,236,018 to Moore, et al. discloses a system for detection of a target sound in an environment using a series of vectors and for notifying a driver. However, Moore does not disclose a method for detecting an emergency vehicle based on light wave frequencies.

As yet another example, U.S. Publication No. 2008/0150755 to Van Zandt, et al. discloses a method for determining and displaying the position and velocity of an emergency vehicle relative to a user. The position and velocity of the emergency vehicle are determined based on audio information. However, Van Zandt does not disclose a method for determining the type of emergency vehicle or a method for analyzing a light wave signal.

Thus, there remains a need for failsafe detection of official vehicles based on both sound and light wave signals, identifying the type of official vehicle, determining whether or not the official vehicle is approaching, and for alerting a driver.

SUMMARY OF THE INVENTION

The present invention is a system and method for detecting the approach of both official and emergency vehicles and alerting drivers. The system is comprised of a local device, a client device, and a vehicle device. The local device includes a processor operatively connected to a set of acoustic and light wave sensors. Ideally, the local device is mounted on the exterior of a vehicle. The local device is wirelessly connected to the vehicle device through an active dongle. The dongle is hardwired to the vehicle device through the OBD II port of the vehicle and is wirelessly connected to the client device.

In use, the local device regularly scans the sensors for analog audio and light signals. The analog signals are digitized and stored in buffers as waveform spectral profiles. The buffers are updated incrementally as the sensors are scanned for new waveform spectral profiles. The waveform spectral profiles in the buffers are processed into a light profile buffer summary and a sound profile buffer summary. The light profile buffer summary is comprised of a set of values assigned for each of a series of frequency ranges in the light profile buffer. The sound profile buffer summary is comprised of a set of values assigned for each of a series of frequency ranges in the sound profile buffer. The sound profile buffer summary also includes the highest frequency detected in the buffer sound profile buffer.

The light profile buffer summary is compared to a table of emergency vehicle types and light signatures to determine whether or not an emergency vehicle is detected. If so, an alert is generated and sent to the vehicle and the client device. Likewise, the sound profile buffer summary is compared to a table of emergency vehicle types and sound signatures to determine whether or not an emergency vehicle is detected. If so, the highest frequency in the sound profile buffer summary is compared to the matching emergency vehicle type signature to determine whether or not the emergency vehicle is approaching or retreating based on doppler shift. If so, an alert is generated by the local device and sent to the dongle, which, in turn sends it to the vehicle device and the client device for display.

In another embodiment, the dongle obtains a set of vehicle status readings from the vehicle device upon recognition of the emergency vehicle, and sends them to the client device, which forwards them to the system server for analysis.

BRIEF DESCRIPTION OF THE DRAWINGS

In the detailed description of the preferred embodiments presented below, reference is made to the accompanying drawings.

DETAILED DESCRIPTION OF THE INVENTION

In the description that follows, like parts are marked throughout the specification and figures with the same numerals, respectively. The figures are not necessarily drawn to scale and may be shown in exaggerated or generalized form in the interest of clarity and conciseness. Unless otherwise stated all tolerances are ±10%.

Figure 1A:
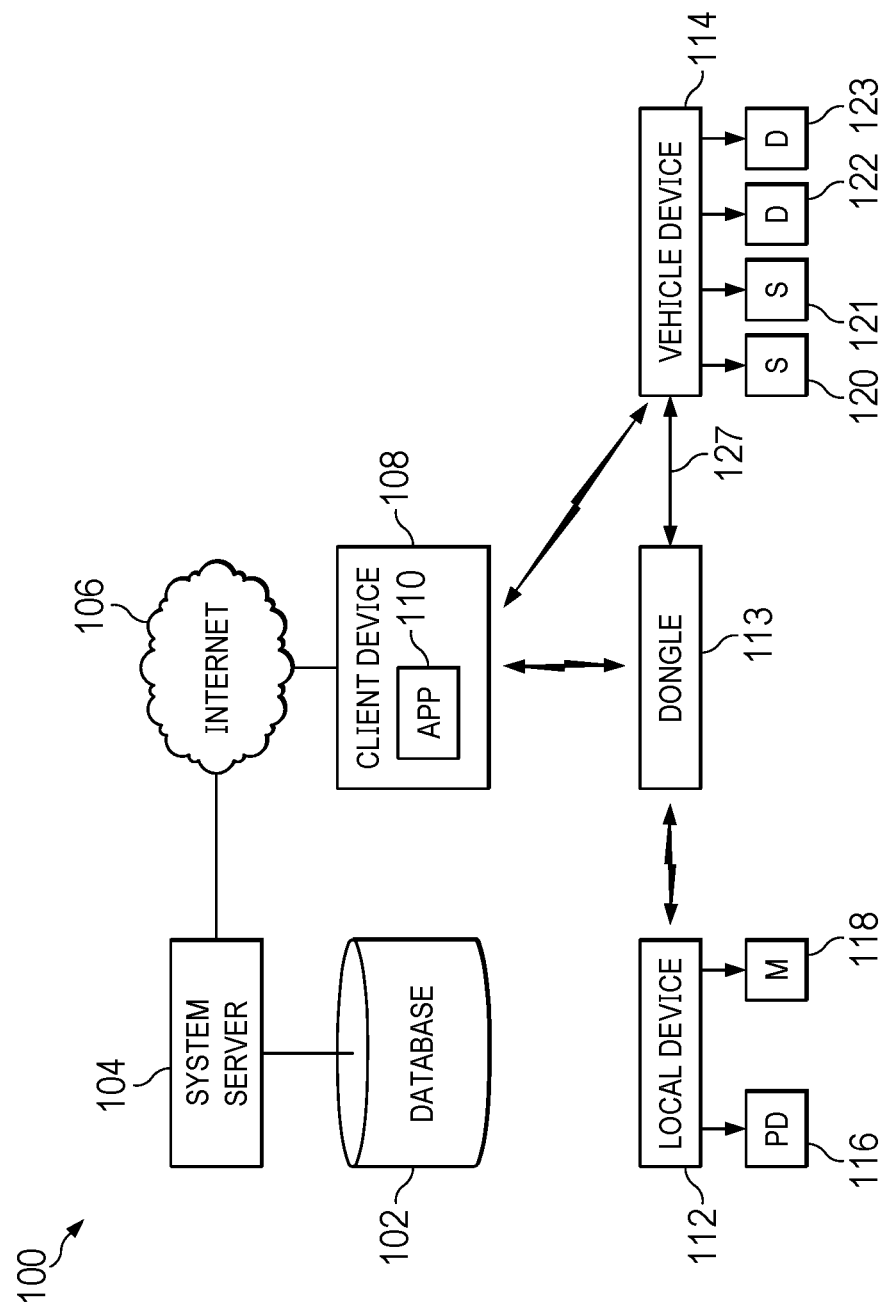
FIG. 1A is a network diagram of a preferred embodiment of a system for detecting emergency vehicles and generating alerts.
Figure 1B:
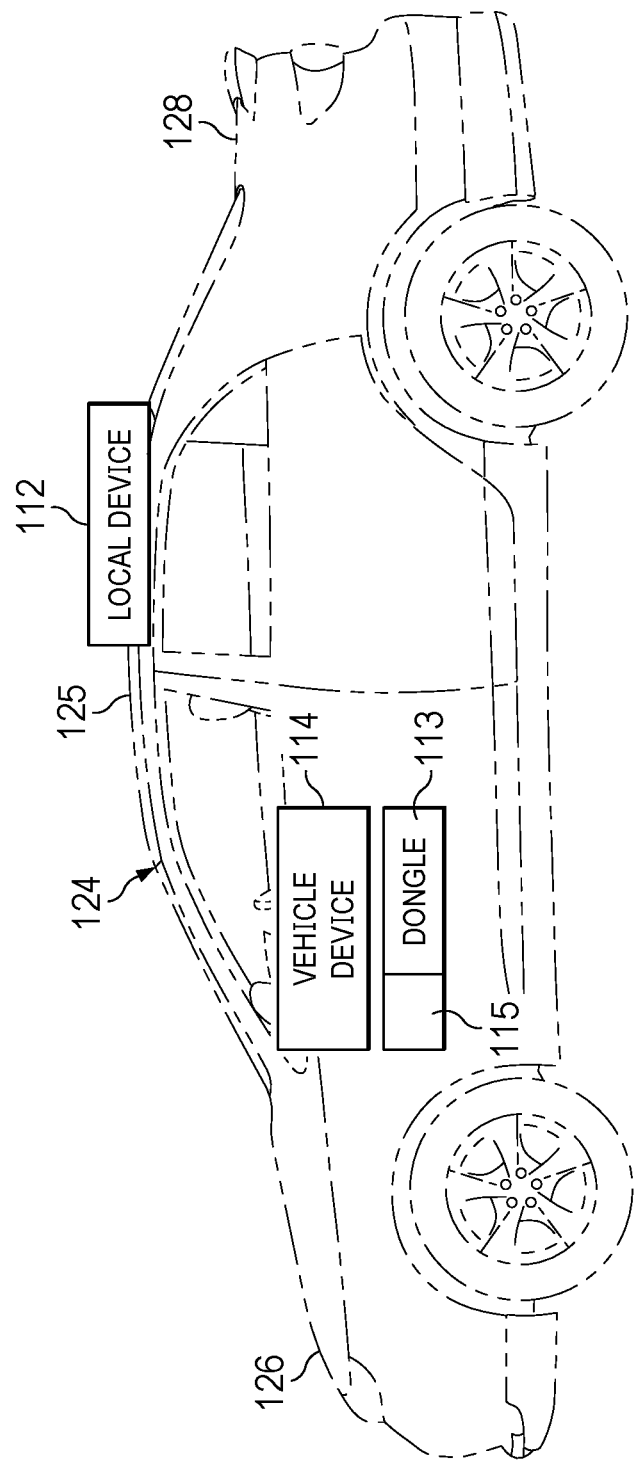
FIG. 1B is a block diagram of a preferred placement of a local device for detecting emergency vehicles.

Referring to FIGS. 1A and 1B, emergency vehicle (EV) detection system 100 will be described.

EV detection system 100 is comprised of system server 104 operatively connected to database 102. Database 102 includes a sound EV signature table and a light EV signature table, as will be further described.

System server 104 connected client device 108 through network 106. Network 106 is a wide area network such as the internet. Client device 108 is a mobile computing device, such as a smart phone or tablet. Client device includes application 110. In a preferred embodiment, application 110 is a mobile application having messaging capabilities installed on client device 108. In an alternate embodiment, application 110 is a standard SMS messaging application. Client device 108 is wirelessly connected to dongle 113 and vehicle device 114 via Bluetooth or Wi-Fi.

Local device 112 is preferably located on roof 125 of vehicle 124, but it may also be located in other positions on the exterior of the vehicle. In a preferred embodiment, local device 112 is positioned near rear end 128 of vehicle 124 at the central apex of the roof. In a preferred embodiment, local device 112 is housed in a transparent or translucent shell which includes means for omnidirectional light capture, such as a dome lens or reflective surfaces.

In a preferred embodiment, local device 112 is connected to vehicle device 114 through dongle 113. Dongle 113 includes a standard 24-pin connector, preferably connected to OBD II port 115, and communicates with vehicle device 114 through controller area network (CAN) BUS 127. In another embodiment, local device 112 utilizes a wireless connection, such as Wi-Fi or Bluetooth, to communicate directly with vehicle device 114.

Dongle 113 is further connected to vehicle device 114. Vehicle device 114 is generally comprised of an electronic control unit (ECU), as will be further described. Vehicle device 114 is preferably located in a dashboard positioned near front 126 of vehicle 124.

Vehicle device 114 is connected to sensors 120 and 121 and displays 122 and 123 resident on the vehicle. In a preferred embodiment, sensors 120 and 121 include brake actuation sensors, speedometers, tachometers, accelerometers, impact sensors, turn signal activation sensors, and airbag deployment sensors. Sensors 120 and 121 are exemplary, as modern vehicles include many types of sensors. Displays 122 and 123 include in dash video and LCD displays. The sensors and displays communicate with vehicle device 114 through the CAN BUS.

Figure 2A:
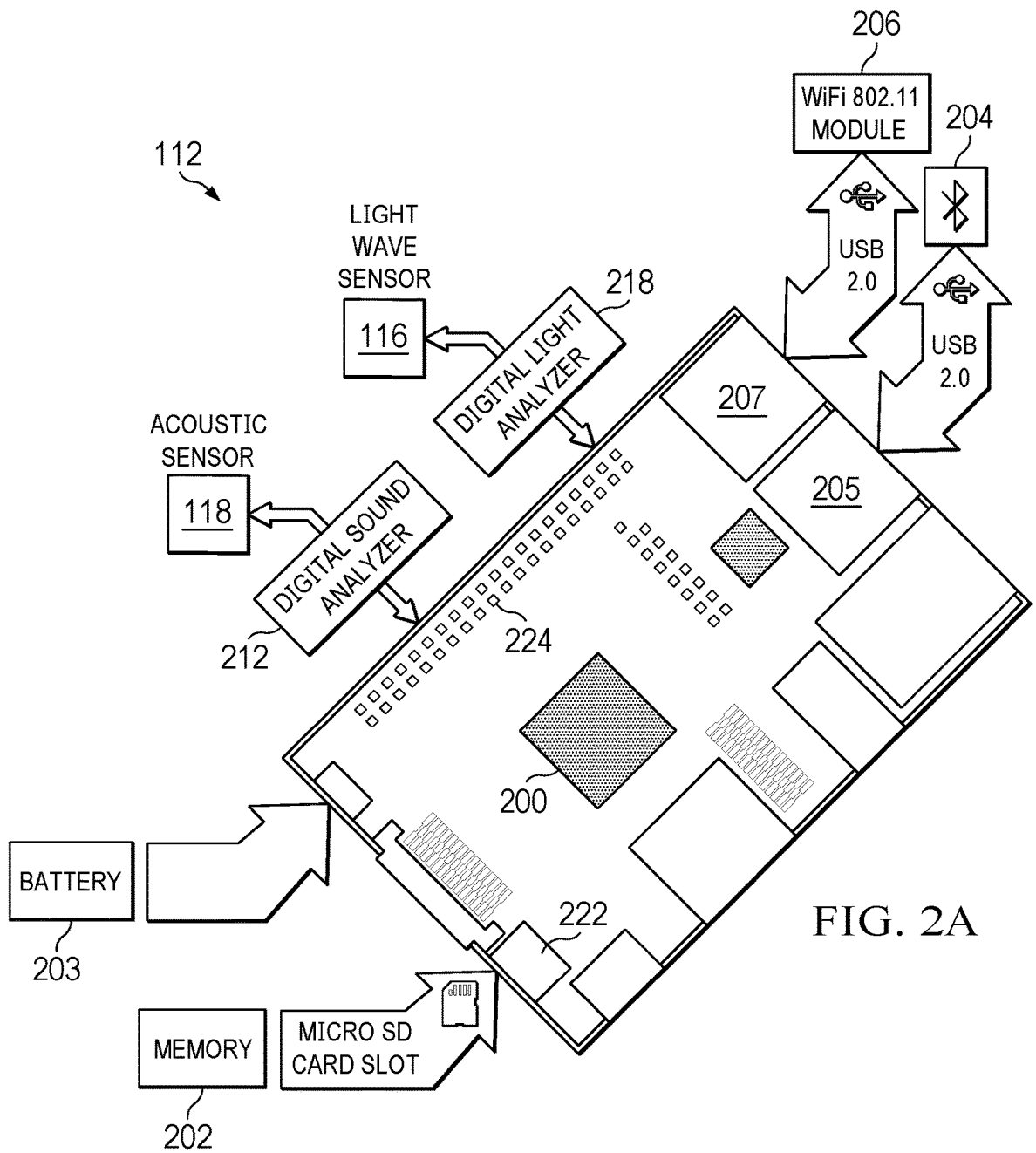
FIG. 2A is an architecture diagram of a preferred embodiment of a local device for detecting emergency vehicles.

Referring then to FIG. 2A, a preferred embodiment of local device 112 will be described.

Local device 112 includes processor 200 operatively connected to memory 202, Bluetooth module 204, Wi-Fi module 206, and battery 203. Local device 112 also is operatively connected to digital sound analyzer 212 and digital light analyzer 218.

In a preferred embodiment, the local device is implemented on a dedicated Arduino Uno available from Arduino, LLC of Somerville, MA. Local device 112 includes two USB 2.0 ports 205 and 207. USB port 205 is connected to Bluetooth module 204. USB port 207 is connected to Wi-Fi module 206.

Local device 112 includes GPIO connector 224. Digital sound analyzer 212 and digital light analyzer 218 are connected to the processor through GPIO connector 224. Light wave sensor 116 is connected to digital light analyzer 218. Acoustic sensor 118 is connected to digital sound analyzer 212.

Acoustic sensor 118 is an omnidirectional microphone having a sensitivity range between about −42 dB to −25 dB, such as CMEJ-4622-25-L082 available from CUI Devices of Tualatin, Oregon. The amplifier is a chipset designed to increase the gain of the microphone, such as MAX9814 by Maxim Integrated Products, Inc. of San Jose, CA. Digital sound analyzer 212 has a graphic equalizer that divides the audio spectrum into multiple frequency bands, such as part no. MSGEQ7 available from Mixed Signal Integration Corporation of San Jose, CA.

Light wave sensor 116 is an photo cell having a spectral range of approximately 350 nm to 1100 nm, such as ISL 29125 VEMD2520X01 available from Vishay Intertechnology, Inc. of Malvern, PA. Digital light analyzer 218 preferably has 6 visible channels each with 40 nm full width at half maximum (FWHM) covering the frequency range 410-690 nm, such as part no. PIM412 available from Pimoroni Ltd. of Yorkshire, UK.

Processor 200 is connected to memory 202 via access slot 222. Code resident on the memory card is used by the processor to actuate the functions of the system, as will be further described.

In one embodiment, local device includes battery 203. In another embodiment, local device may be hardwired into the vehicle power system.

Figure 2B:
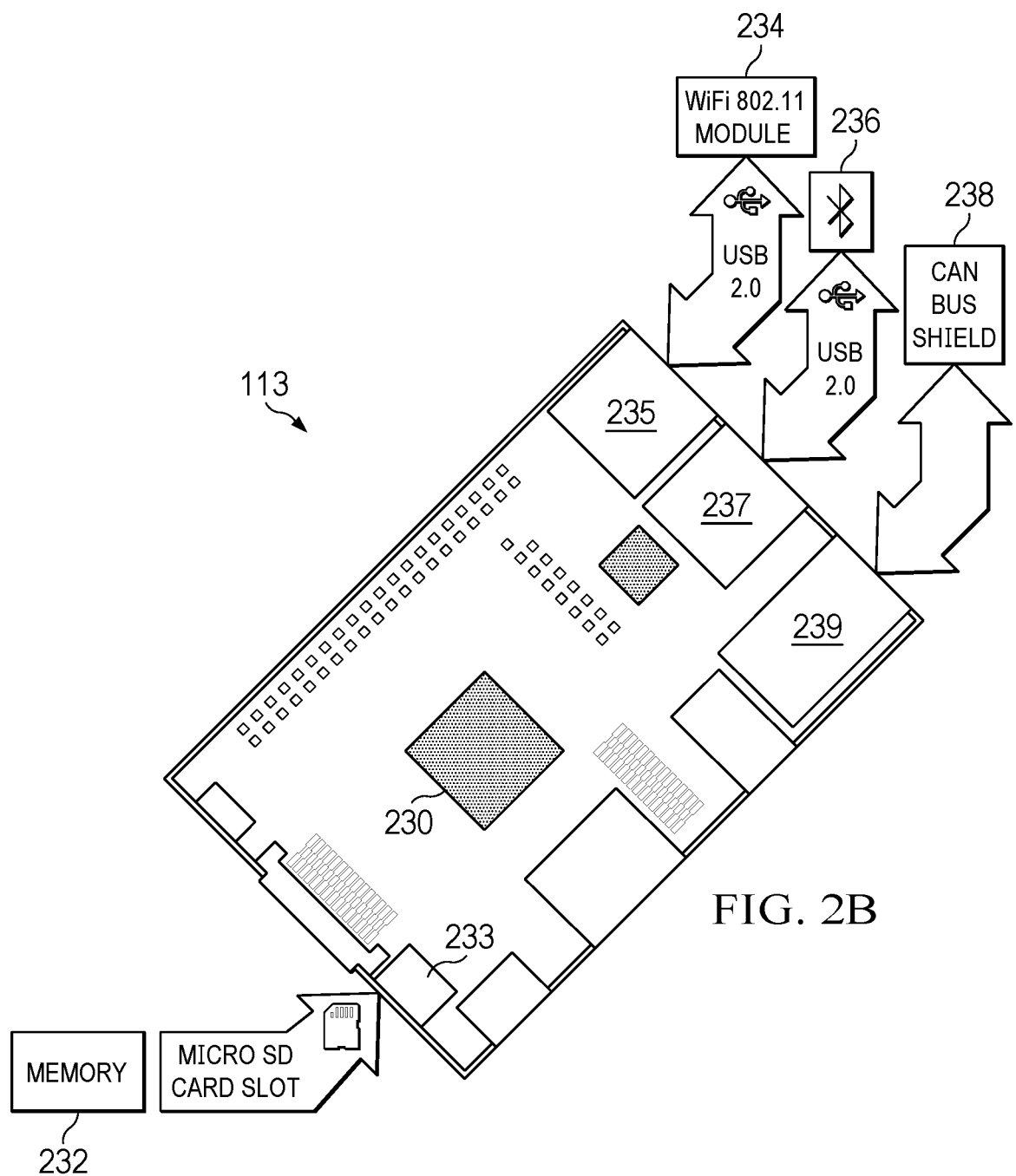
FIG. 2B is an architecture diagram of a wireless dongle for a local device.

Referring then to FIG. 2B, a preferred embodiment of dongle 113 will be described.

Dongle 113 includes processor 230 operatively connected to memory 232, Wi-Fi module 234, and Bluetooth module 236. In a preferred embodiment, Wi-Fi module 234 generates a secure wireless connection to local device 112 and Bluetooth module 236 connects to client device 108.

In a preferred embodiment, the dongle is implemented on a dedicated Arduino Uno. Dongle 113 includes three peripheral ports 235, 237, and 239. The peripheral ports may be USB 2.0 ports, or GPIO connectors. Port 235 is connected to Wi-Fi module 234. In a preferred embodiment, Wi-Fi module 234 is ESP8266 available from Seeed Technology Co., Ltd. of Shenzhen, China. Port 237 is connected to Bluetooth module 236. In a preferred embodiment, Bluetooth module 236 is KC-05 Bluetooth module a available from ElectroPeak, Inc. of Shenzhen, China.

Port 239 is connected to CAN Bus shield 238. In a preferred embodiment, port 239 is a GPIO connector and connects CAN Bus shield 238 to processor 230. CAN Bus shield 238 connects directly to the OBD II port of a vehicle and includes a CAN controller and a CAN transceiver to transmit commands to a vehicle ECU and log vehicle data, such as part no. 103030215 available from Seeed Technology Co., Ltd. of Shenzhen, China.

Processor 230 is connected to memory 232 via access slot 233. Code resident on the memory card is used to send interrupt signals and messages along the CAN Bus to the vehicle device and to receive and store vehicle response data, as will be further described.

Figure 3:
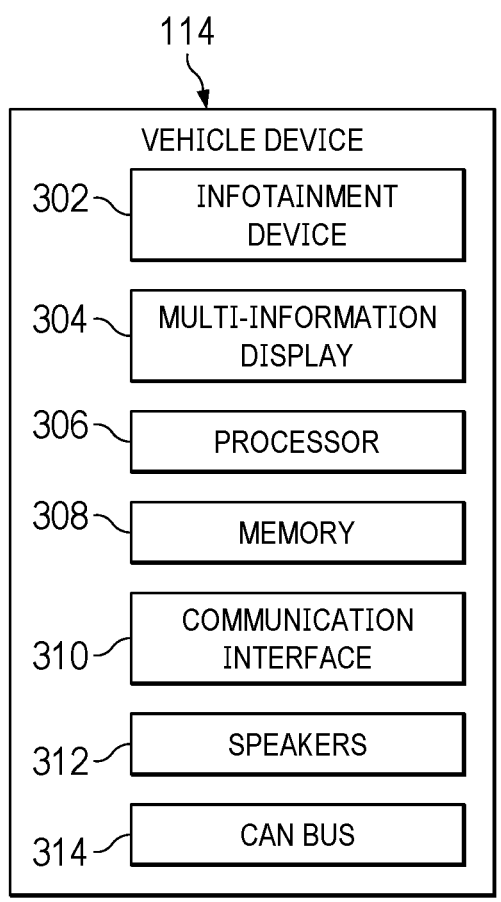
FIG. 3 is an architecture diagram of a vehicle device in a system for detecting emergency vehicles.

Referring then to FIG. 3, a preferred embodiment of vehicle device 114 will be further described.

Vehicle device 114 is resident in the vehicle and is generally comprised of processor 306 operatively connected to infotainment display 302, multi-information display 304, communication interface 310, speakers 312, memory 308, and CAN Bus 314. CAN Bus 314 provides an operative communication channel between the vehicle device and the dongle. Communication interface 310 includes Bluetooth capabilities. In alternate embodiments, communication interface 310 may also include Wi-Fi, and cellular capabilities.

Figure 4:
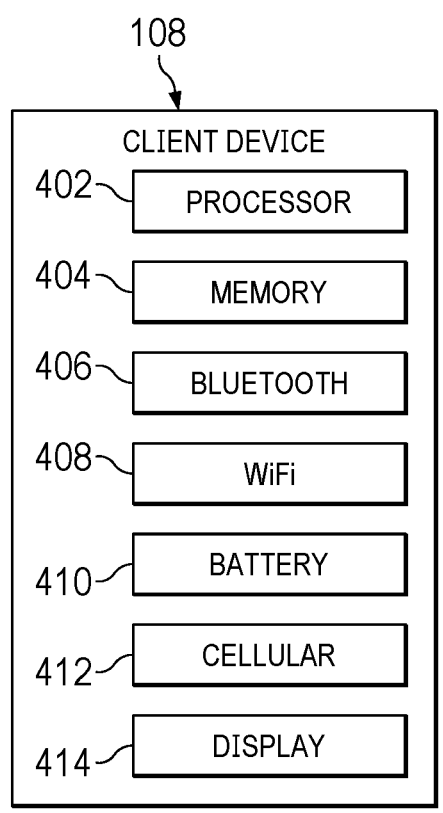
FIG. 4 is an architecture diagram of a client device in a system for detecting emergency vehicles

Referring then to FIG. 4, a preferred embodiment of client device 108 will be described.

In a preferred embodiment, client device 108 is a smart phone having processor 402 operatively connected to memory 404, Bluetooth module 406, Wi-Fi module 408, battery 410, cellular transceiver 412, and display 414.

Figure 5A:
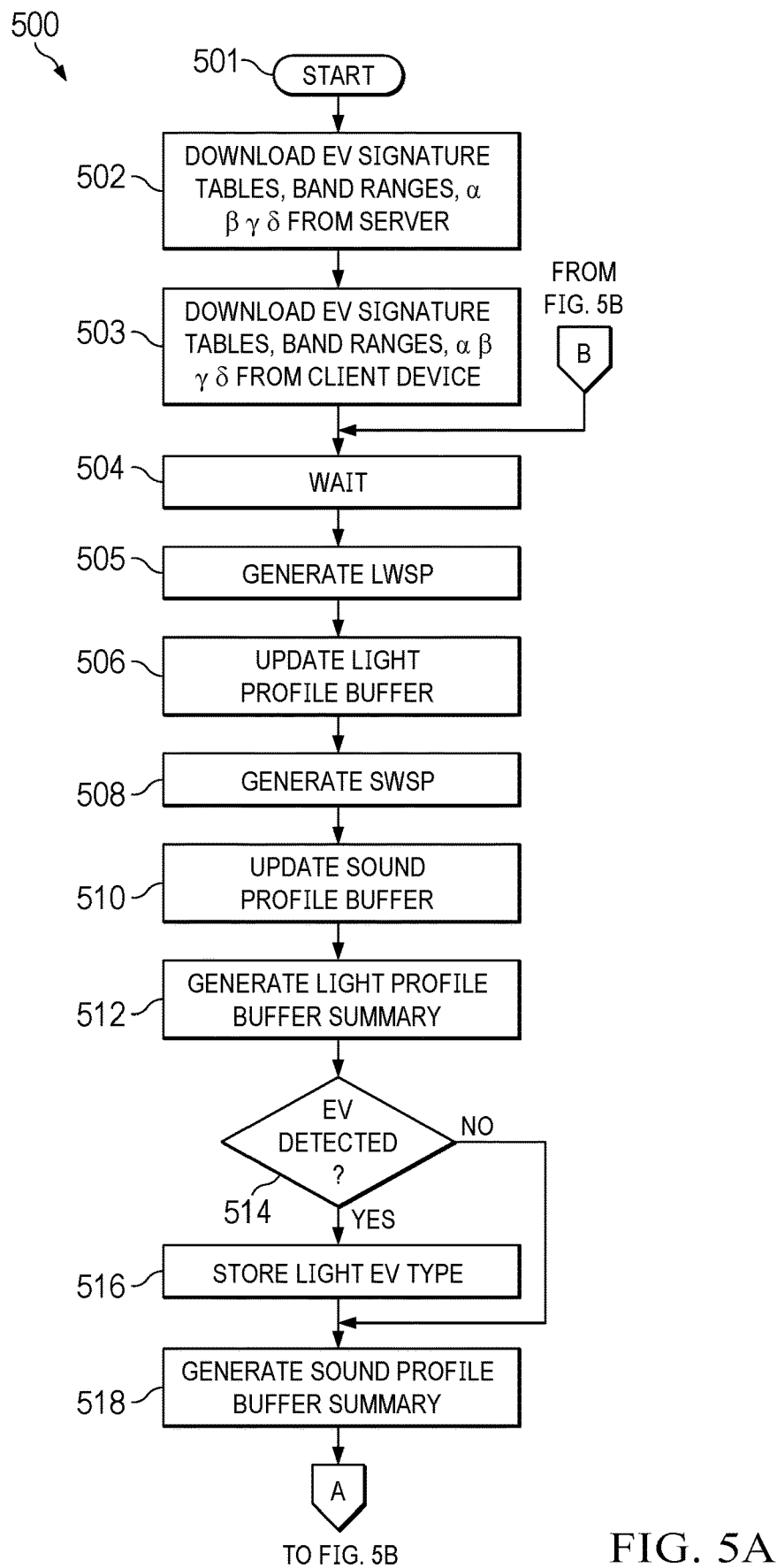
FIGS. 5A and 5B is a flow chart of a preferred method of emergency vehicle detection.
Figure 5B:
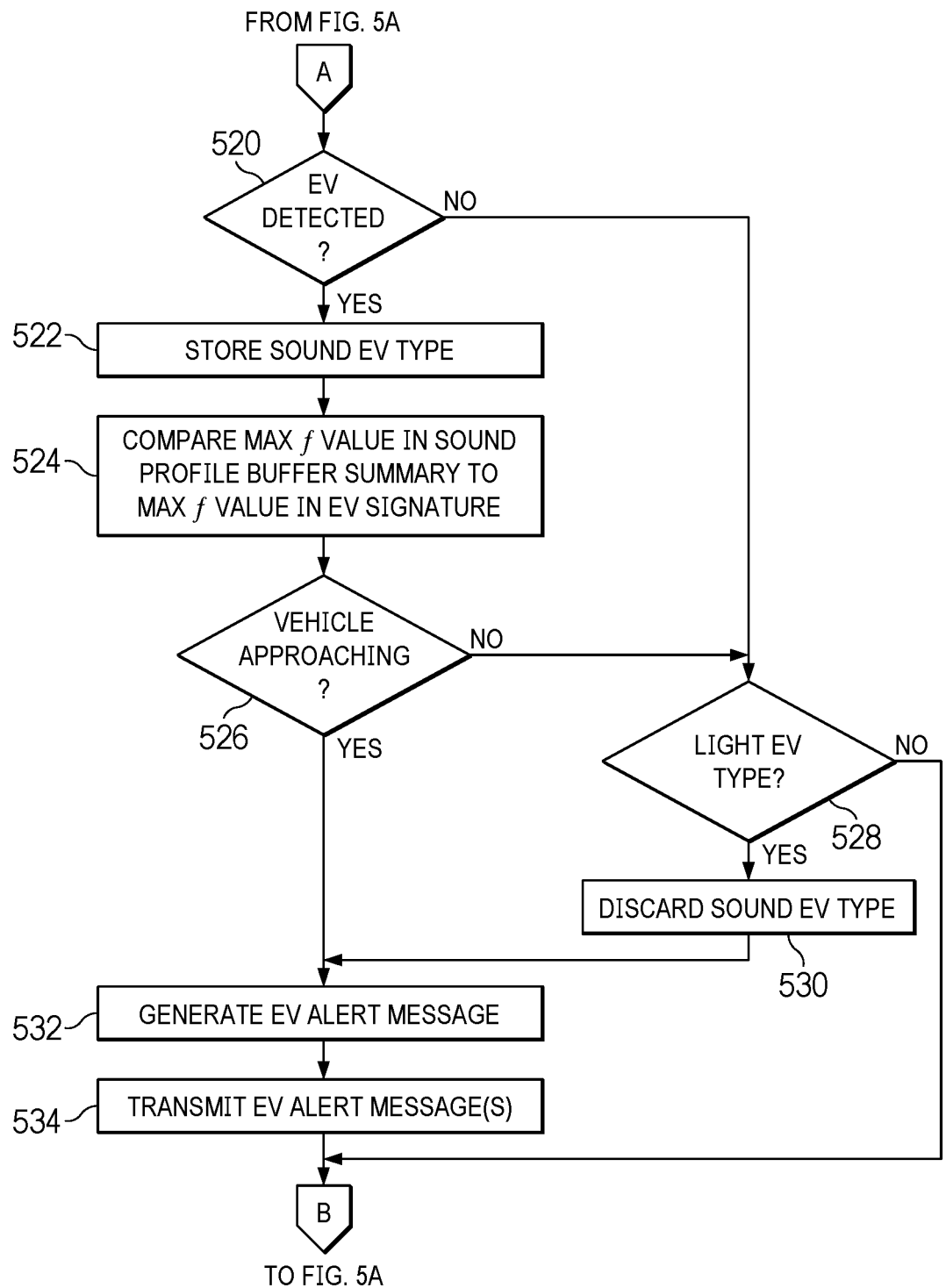

Referring then to FIGS. 5A and 5B, preferred method 500 for detecting emergency vehicles will be further described. Method 500 takes the form of a software program resident in memory 202 which is executed by processor 200 of local device 112.

At step 501, the method begins.

At step 502, client device 108 downloads the EV signature tables, light wave and acoustic band ranges and cut off values $\alpha$, $\beta$, $\gamma$, and $\delta$ from the server.

At step 503, processor 200 downloads the EV signature tables, light wave and acoustic band ranges and cut off values $\alpha$, $\beta$, $\gamma$, and $\delta$ from client device 108 from the dongle.

At step 504, processor 200 waits a predetermined period of time. In a preferred embodiment, the processor waits in 2-3 second epochs. Of course, other preset time periods may be used.

At step 505, analog signals from light wave sensor 116 are read and digitized by digital light analyzer 218. A light waveform spectral profile (LWSP) is generated for time, $t_x$. In a preferred embodiment, the LWSP is stored as a maximum amplitude value, $LA_x$, for each of a series of frequency band ranges, $LB_{1-6}$. An example, of a LWSP is shown below:

TABLE 1

| $LWSP_x$ | | | | | | |
|---|---|---|---|---|---|---|
| f | $LB_1$ | $LB_2$ | $LB_3$ | $LB_4$ | $LB_5$ | $LB_6$ |
| A | $LA_{x1}$ | $LA_{x2}$ | $LA_{x3}$ | $LA_{x4}$ | $LA_{x5}$ | $LA_{x6}$ |

In a preferred embodiment, there are six (6) frequency bands, $LB_{1-6}$. Preferably, frequency band $LB_1$ is 450 nm, frequency band $LB_2$ is 500 nm, frequency band $LB_3$ is 550 nm, frequency band $LB_4$ is 570 nm, frequency band $LB_5$ is 600 nm, and frequency band $LB_6$ is 650 nm. Each frequency band has a ±40 nm full width at half maximum (FWHM). Other band ranges may be used. In a preferred embodiment, A is stored for each LB as counts per $\mu W/cm^2$.

At step 506, the light profile buffer is updated with the most recent LWSP, as will be further described.

At step 508, analog signals from acoustic sensor 118 are read and digitized by digital sound analyzer 212. A sound waveform spectral profile (SWSP) is generated for time, $t_x$. In a preferred embodiment, the SWSP is stored as an amplitude value, $SA_x$, for each of a series of frequency band ranges, $SB_{1-7}$. In a preferred embodiment, the SWSP includes the maximum frequency detected at time $t_x$. An example, of a SWSP is shown below:

TABLE 2

| $SWSP_x$ | | | | | | | | |
|---|---|---|---|---|---|---|---|---|
| f | $SB_1$ | $SB_2$ | $SB_3$ | $SB_4$ | $SB_5$ | $SB_6$ | $SB_7$ | HF |
| A | $SA_{x1}$ | $SA_{x2}$ | $SA_{x3}$ | $SA_{x4}$ | $SA_{x5}$ | $SA_{x6}$ | $SA_{x7}$ | $HFV_x$ |

In a preferred embodiment, there are seven (7) frequency bands, $SB_{1-7}$. Preferably, frequency band $SB_1$ is 63 Hz, frequency band $SB_2$ is 160 Hz, frequency band $SB_3$ is 400 Hz frequency band $SB_4$ is 1 kHz, frequency band $SB_5$ is 2.5 kHz, frequency band $SB_6$ is 6.25 kHz, and frequency band $SB_7$ is 16 kHz. In a preferred embodiment, A is stored for each SWSP in $mW/m^2$. Alternatively, A may be stored in dB. Other band ranges may be used. In a preferred embodiment, HF is stored as Hz. Generally, emergency vehicle frequencies range between 500 Hz and 1500 Hz.

At step 510, the sound profile buffer is updated with the most recent SWSP, as will be further described.

At step 512, a light profile buffer summary is generated, as will be further described.

At step 514, the light profile buffer summary is compared to the light EV signature table to determine whether or not an emergency vehicle is detected, as will be further described. If so, the method proceeds to step 516. If not, the method proceeds to step 518.

At step 516, the light EV type for the emergency vehicle identified in step 514 is stored.

At step 518, a sound profile buffer summary is generated, as will be further described.

At step 520, the sound profile buffer summary is compared to the sound EV signature table to determine whether or not an emergency vehicle is detected, as will be further described. If so, the method proceeds to step 522. If not, the method proceeds to step 528.

At step 522, the sound EV type for the emergency vehicle identified at step 520 is stored.

At step 524, the maximum frequency in the sound profile buffer summary is compared to the maximum frequency associated with the sound EV type sound signature.

At step 526, the processor determines whether or not the EV is approaching or retreating. If the maximum frequency in the sound profile buffer summary is lower than the maximum frequency associated with the EV sound signature, then the EV is assumed to be retreating from vehicle 124. If the maximum frequency in the sound profile buffer summary is higher than the maximum frequency associated with the EV sound signature, then the EV is assumed to be approaching vehicle 124. In the event that the maximum frequency in the sound profile buffer summary is exactly equal to the maximum frequency associated with the EV sound signature, then, by convention, the EV is assumed to be approaching vehicle 124. If the EV is retreating, the method proceeds to step 528. If the EV is approaching, the method proceeds to step 532.

At step 528, the processor determines whether or not a light EV type was stored in step 516. If so, the method proceeds to step 530. If not, the method returns to step 502.

At step 530, the sound EV type stored at step 522 is discarded, so as to prioritize the light EV type over the sound EV type which is now assumed to be retreating.

At step 532, an EV alert message is generated, as will be further described.

At step 534, the EV alert message is transmitted to the vehicle and the client device for display, as will be further described. The method then returns to step 502.

Figure 6A:
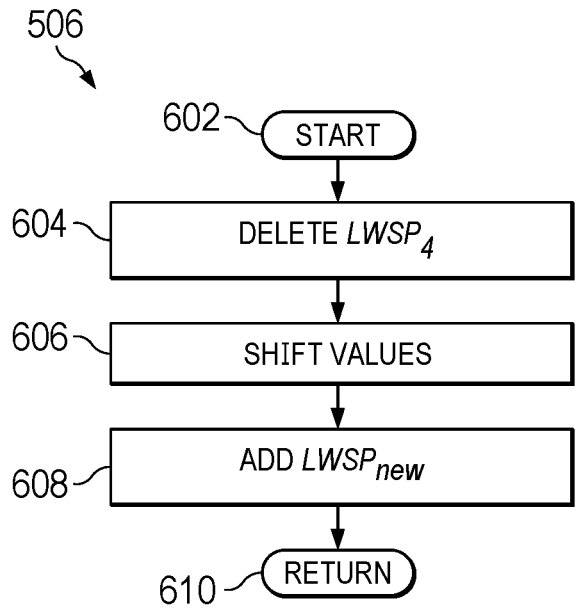
FIG. 6A is a flow chart of a preferred method of updating a light profile buffer.

Referring then to FIG. 6A, step 506 will be further described.

In general, the light profile buffer is comprised of the set of the amplitude values for the five (5) most recent light waveform spectral profiles (LWSP), $LWSP_{0-4}$, taken at times $t_{0-4}$ and stored in a first in first out table (FIFO). An example, of a light profile buffer is shown below:

TABLE 3

Light Profile Buffer

| $LWSP_x$ | time | $LB_1$ | $LB_2$ | $LB_3$ | $LB_4$ | $LB_5$ | $LB_6$ |
|---|---|---|---|---|---|---|---|
| $LWSP_0$ | $t_0$ | $LA_{01}$ | $LA_{02}$ | $LA_{03}$ | $LA_{04}$ | $LA_{05}$ | $LA_{06}$ |
| $LWSP_1$ | $t_1$ | $LA_{11}$ | $LA_{12}$ | $LA_{13}$ | $LA_{14}$ | $LA_{15}$ | $LA_{16}$ |
| $LWSP_2$ | $t_2$ | $LA_{21}$ | $LA_{22}$ | $LA_{23}$ | $LA_{24}$ | $LA_{25}$ | $LA_{26}$ |
| $LWSP_3$ | $t_3$ | $LA_{31}$ | $LA_{32}$ | $LA_{33}$ | $LA_{34}$ | $LA_{35}$ | $LA_{36}$ |
| $LWSP_4$ | $t_4$ | $LA_{41}$ | $LA_{42}$ | $LA_{43}$ | $LA_{44}$ | $LA_{45}$ | $LA_{46}$ |

At step 602, the method begins.

At step 604, $LWSP_4$, amplitude values $LA_{41-46}$, are deleted.

At step 606, $LWSP_0$ through $LWSP_3$ are shifted down, $LWSP_0$ becomes $LWSP_1$, $LWSP_1$ becomes $LWSP_2$, $LWSP_2$ becomes $LWSP_3$, and $LWSP_3$ becomes $LWSP_4$, as shown in Table 4 below:

TABLE 4

Light Profile Buffer

| $LWSP_x$ | time | $LB_1$ | $LB_2$ | $LB_3$ | $LB_4$ | $LB_5$ | $LB_6$ |
|---|---|---|---|---|---|---|---|
| $LWSP_{new}$ | $t_0$ | | | | | | |
| $LWSP_0$ | $t_1$ | $LA_{01}$ | $LA_{02}$ | $LA_{03}$ | $LA_{04}$ | $LA_{05}$ | $LA_{06}$ |
| $LWSP_1$ | $t_2$ | $LA_{11}$ | $LA_{12}$ | $LA_{13}$ | $LA_{14}$ | $LA_{15}$ | $LA_{16}$ |
| $LWSP_2$ | $t_3$ | $LA_{21}$ | $LA_{22}$ | $LA_{23}$ | $LA_{24}$ | $LA_{25}$ | $LA_{26}$ |
| $LWSP_3$ | $t_4$ | $LA_{31}$ | $LA_{32}$ | $LA_{33}$ | $LA_{34}$ | $LA_{35}$ | $LA_{36}$ |

At step 608, the $LWSP_{new}$ is stored in the $t_0$ row. $LWSP_{new}$ contains the most recent set of readings from the sensors, at now $t_0$.

At step 610, the updated light profile buffer is returned.

Figure 6B:
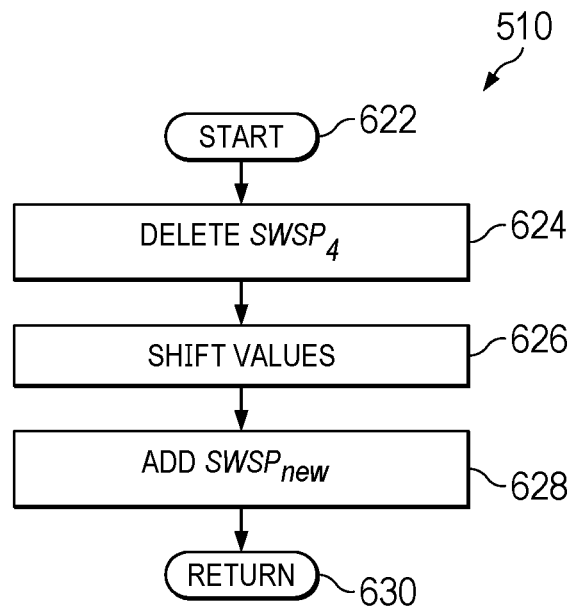
FIG. 6B is a flow chart of a preferred method of updating a sound profile buffer.

Referring then to FIG. 6B, step 510 will be further described.

In general, the sound profile buffer is comprised of the set of the amplitude values for the five (5) most recent sound waveform spectral profiles (SWSP), $SWSP_{0-4}$, taken at times $t_{0-4}$ and stored in a FIFO table. An example, of a sound profile buffer is shown below:

TABLE 5

Sound Profile Buffer

| $SWSP_x$ | time | $SB_1$ | $SB_2$ | $SB_3$ | $SB_4$ | $SB_5$ | $SB_6$ | $SB_7$ |
|---|---|---|---|---|---|---|---|---|
| $SWSP_0$ | $t_0$ | $SA_{01}$ | $SA_{02}$ | $SA_{03}$ | $SA_{04}$ | $SA_{05}$ | $SA_{06}$ | $SA_{07}$ |
| $SWSP_1$ | $t_1$ | $SA_{11}$ | $SA_{12}$ | $SA_{13}$ | $SA_{14}$ | $SA_{15}$ | $SA_{16}$ | $SA_{17}$ |
| $SWSP_2$ | $t_2$ | $SA_{21}$ | $SA_{22}$ | $SA_{23}$ | $SA_{24}$ | $SA_{25}$ | $SA_{26}$ | $SA_{27}$ |
| $SWSP_3$ | $t_3$ | $SA_{31}$ | $SA_{32}$ | $SA_{33}$ | $SA_{34}$ | $SA_{35}$ | $SA_{36}$ | $SA_{37}$ |
| $SWSP_4$ | $t_4$ | $SA_{41}$ | $SA_{42}$ | $SA_{43}$ | $SA_{44}$ | $SA_{45}$ | $SA_{46}$ | $SA_{47}$ |

At step 622, the method begins.

At step 624, $SWSP_4$, amplitude values $SA_{41-47}$, are deleted.

At step 626, $SWSP_0$ through $SWSP_3$ are shifted down, $SWSP_0$ becomes $SWSP_1$, $SWSP_1$ becomes $SWSP_2$, $SWSP_2$ becomes $SWSP_3$, and $SWSP_3$ becomes $SWSP_4$, as shown in Table 6 below:

TABLE 6

Sound Profile Buffer

| $SWSP_x$ | time | $SB_1$ | $SB_2$ | $SB_3$ | $SB_4$ | $SB_5$ | $SB_6$ | $SB_7$ |
|---|---|---|---|---|---|---|---|---|
| $SWSP_{new}$ | $t_0$ | | | | | | | |
| $SWSP_0$ | $t_1$ | $SA_{01}$ | $SA_{02}$ | $SA_{03}$ | $SA_{04}$ | $SA_{05}$ | $SA_{06}$ | $SA_{07}$ |
| $SWSP_1$ | $t_2$ | $SA_{11}$ | $SA_{12}$ | $SA_{13}$ | $SA_{14}$ | $SA_{15}$ | $SA_{16}$ | $SA_{17}$ |
| $SWSP_2$ | $t_3$ | $SA_{21}$ | $SA_{22}$ | $SA_{23}$ | $SA_{24}$ | $SA_{25}$ | $SA_{26}$ | $SA_{27}$ |
| $SWSP_3$ | $t_4$ | $SA_{31}$ | $SA_{32}$ | $SA_{33}$ | $SA_{34}$ | $SA_{35}$ | $SA_{36}$ | $SA_{37}$ |

At step 628, the $SWSP_{new}$ is stored in the $t_0$ row. $SWSP_{new}$ contains the most recent set of readings from the sensors at now, $t_0$.

At step 630, the updated sound profile buffer is returned.

Figure 7A:
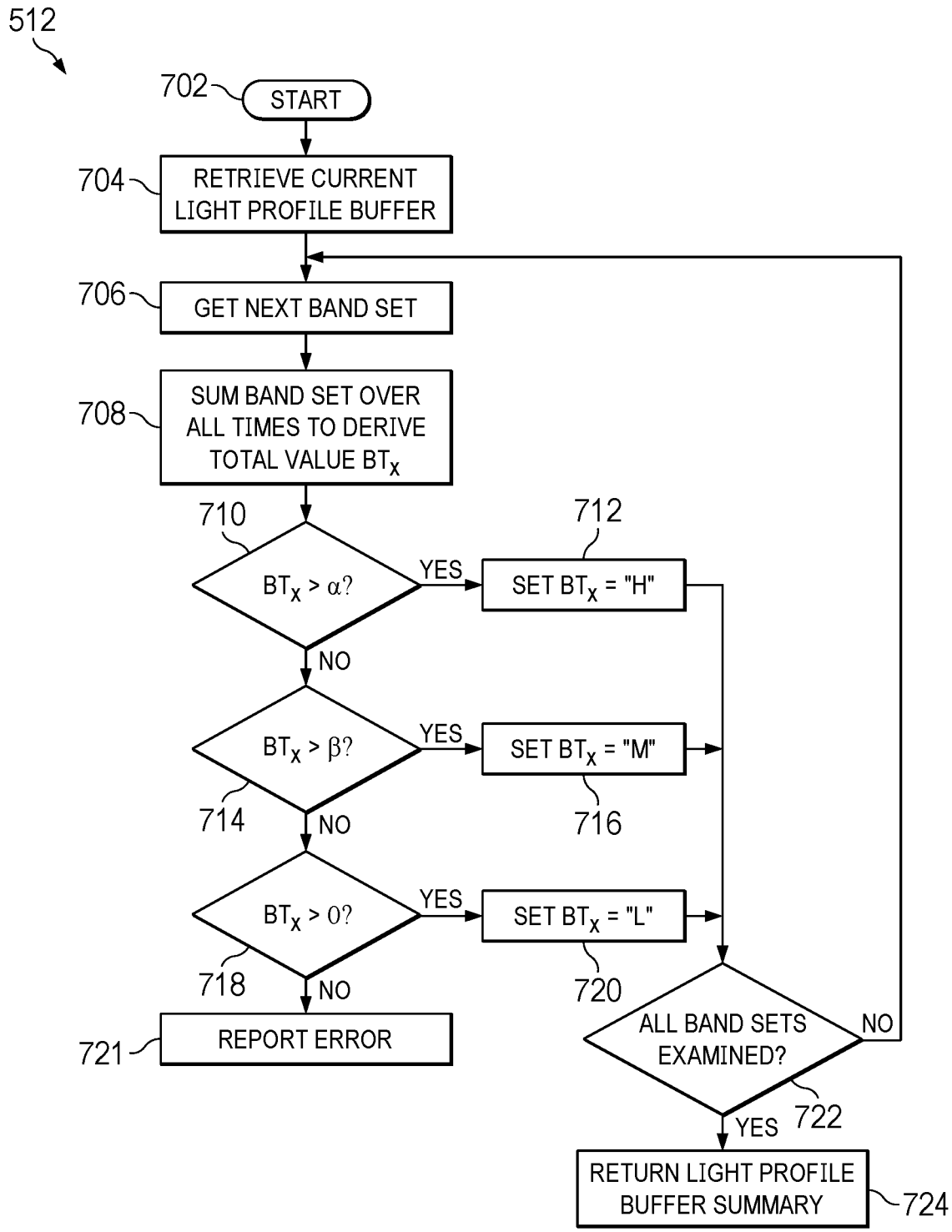
FIG. 7A is a flow chart of a preferred method of processing light signals.

Referring then to FIG. 7A, a preferred method of step 512 will be further described.

In general, the light profile buffer summary is comprised of a set of ranked values for summations of amplitudes for each of the frequency band ranges for each time signature. In a preferred embodiment, character values of "H", "M", and "L" are assigned as the ranked values. A set of predetermined cutoff levels $\alpha$, $\beta$, and 0 are used to rank the ranges, where $a > \beta > 0$. It should be appreciated that a different number of band ranges and different cut off values may be used.

At step 702, the method begins.

At step 704, the current light profile buffer is retrieved.

At step 706, a frequency band set is retrieved. The frequency band set is comprised of the amplitude values over all times, $t_{0-4}$, for a chosen frequency band, $LB_x$.

At step 708, the frequency band set is summed down the column to derive a total value, $BT_x$, according to the following equation:

$$BT_x = LA_{0x} + LA_{1x} + LA_{2x} + LA_{3x} + LA_{4x}$$

At step 710, the system determines whether or not the total value $BT_x$ is greater than a predetermined value, $\alpha$. In a preferred embodiment, $\alpha$ is about 200 counts per $\mu W/cm^2$. If so, the method proceeds to step 712. If not, the method proceeds to step 714.

At step 712, the ranked value for $BT_x$ is set to "H". The method then proceeds to step 722.

At step 714, the system determines whether or not the total value $BT_x$ is greater than a predetermined value, $\beta$. In a preferred embodiment, $\beta$ is about 100 counts per $\mu W/cm^2$. If so, the method proceeds to step 716. If not, the method proceeds to step 718.

At step 716, the ranked value for $BT_x$ is set to "M". The method then proceeds to step 722.

At step 718, the system determines whether or not the total value $BT_x$ is greater than 0. If so, the method proceeds to step 720. If not, the method proceeds to step 721.

At step 720, the ranked value for $BT_x$ is set to "L". The method then proceeds to step 722.

At step 721, if the total value is less than zero an error is reported and the method returns.

At step 722, the system queries whether or not each frequency band set in the light profile buffer has been examined. If not, the method returns to step 706 and the next frequency band set is retrieved. If so, the method proceeds to step 724.

At step 724, the light profile buffer summary is returned. An example of a prophetic light profile buffer summary is shown below.

TABLE 7

Light Profile Buffer Summary

| Band | $LB_1$ | $LB_2$ | $LB_3$ | $LB_4$ | $LB_5$ | $LB_6$ |
|---|---|---|---|---|---|---|
| Summary | L | M | L | L | L | H |

Figure 7B:
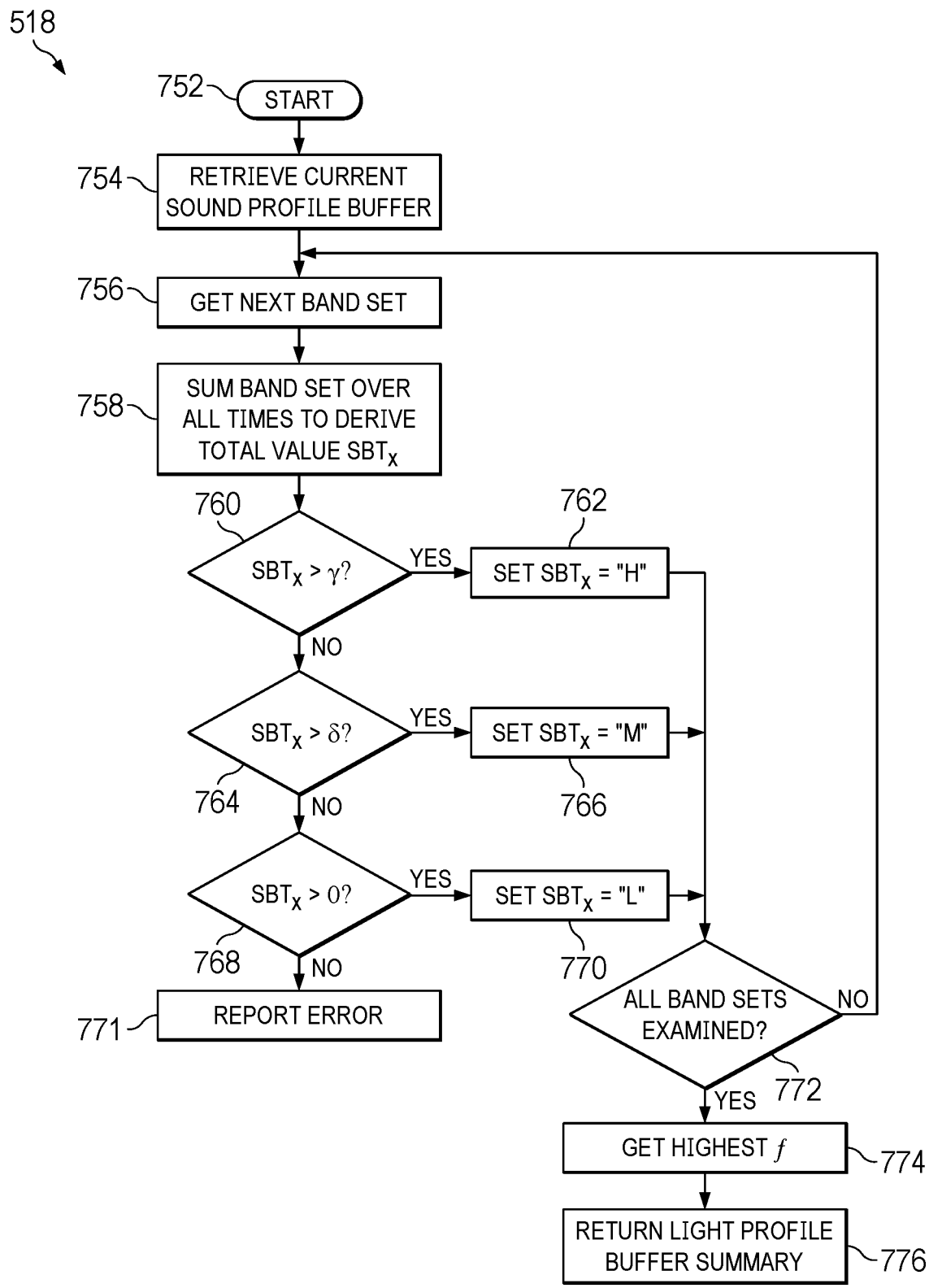
FIG. 7B is a flow chart of a preferred method of processing sound signals.

Referring then to FIG. 7B, a preferred method of step 518 will be further described.

In general, the sound profile buffer summary is comprised of ranked values for the summations of amplitudes for each of the frequency band ranges for each time signature. In a preferred embodiment, character values of "H", "M", and "L" are assigned. A set of predetermined cutoff levels $\gamma$, $\delta$, and 0 are used to rank the ranges, where $\gamma > \delta > 0$. It should be appreciated that a different number of band ranges and different cutoff values may be used. The sound profile buffer summary is further comprised of the highest frequency value in the sound profile buffer.

At step 752, the method begins.

At step 754, the current sound profile buffer is retrieved.

At step 756, a frequency band set is retrieved. The frequency band set is comprised of the amplitude values over all times, $t_{0-4}$, for a frequency band, $SB_x$.

At step 758, the frequency band set is summed down the column to derive a total value, $SBT_x$, according to the following equation:

$$SBT_x = SA_{0x} + SA_{1x} + SA_{2x} + SA_{3x} + SA_{4x}$$

At step 760, the system determines whether or not the total value $SBT_x$ is greater than a predetermined value, $\gamma$. In a preferred embodiment, $\gamma$ is about $5 \times 10^{-6}$ $mW/m^2$. If so, the method proceeds to step 762. If not, the method proceeds to step 764.

At step 762, the ranked value for $SBT_x$ is set to "H". The method then proceeds to step 772.

At step 764, the system determines whether or not the total value $SBT_x$ is greater than a predetermined value, $\delta$. In a preferred embodiment, $\delta$ is about $1.58 \times 10^{-7}$ $mW/m^2$. If so, the method proceeds to step 766. If not, the method proceeds to step 768.

At step 766, the ranked value for $SBT_x$ is set to "M". The method then proceeds to step 772.

At step 768, the system determines whether or not the total value $SBT_x$ is greater than 0. If so, the method proceeds to step 770. If not, the method proceeds to step 771.

At step 770, the ranked value for $SBT_x$ is set to "L". The method then proceeds to step 772.

At step 771, if the total value is less than zero an error is reported and the method returns.

At step 722, the system queries whether or not each frequency band set in the light profile buffer has been examined. If not, the method returns to step 756 and the next frequency band set is retrieved. If so, the method proceeds to step 774.

At step 774, the highest f value, HFV, is retrieved from the sound profile buffer.

At step 776, the sound profile buffer summary is returned. An example of a prophetic sound profile buffer summary is shown below.

TABLE 8

Sound Profile Buffer Summary

| | $SB_1$ | $SB_2$ | $SB_3$ | $SB_4$ | $SB_5$ | $SB_6$ | $SB_7$ | HVF |
|---|---|---|---|---|---|---|---|---|
| Summary | L | M | L | H | M | L | L | H |

Figure 8A:
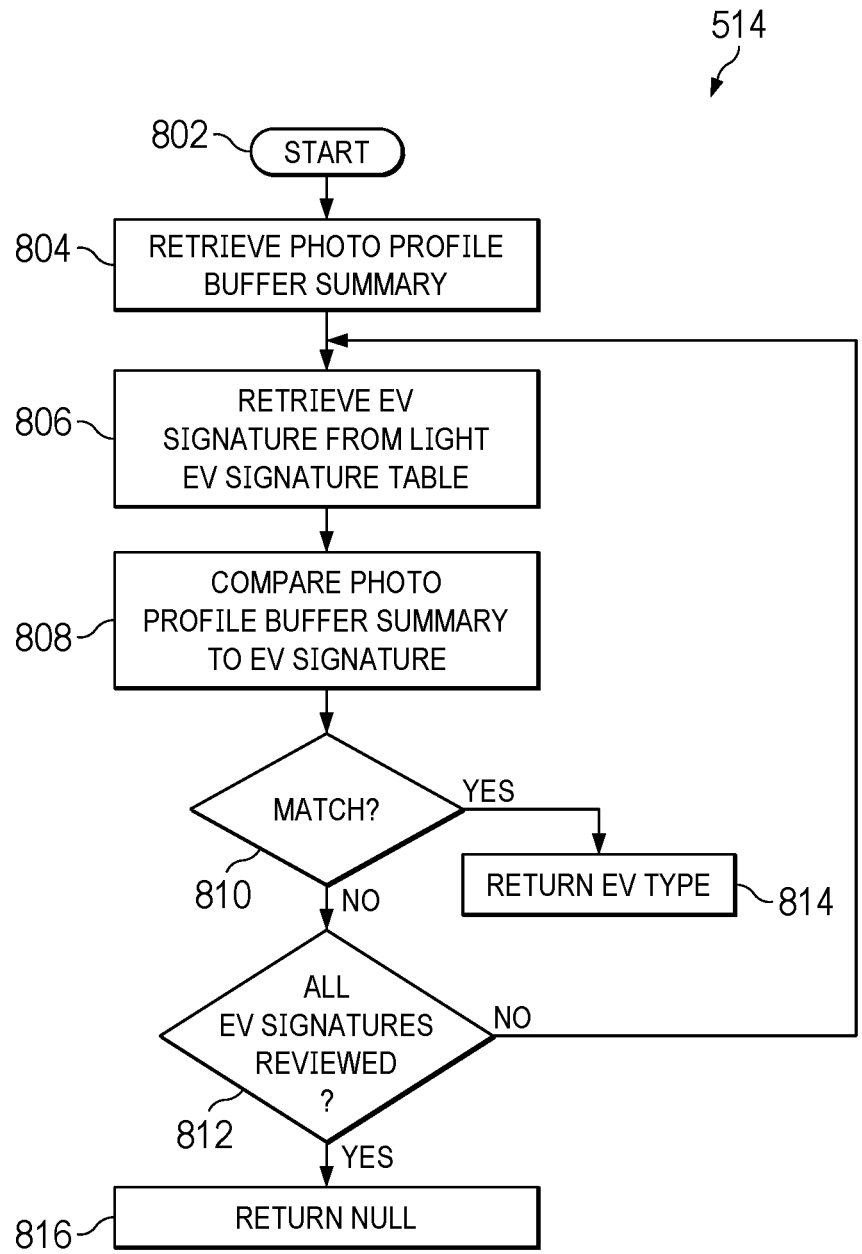
FIG. 8A is a flow chart of a method of identifying an emergency vehicle.

Referring then to FIG. 8A, a preferred method of step 514 will be further described.

In general, determining whether or not an EV is detected requires a comparison of the current light profile buffer summary to all EV light signatures stored in memory to find a matching vehicle type.

At step 802, the method begins.

At step 804, the light profile buffer summary is retrieved.

At step 806, an EV signature from the light EV signature table is retrieved. In a preferred embodiment, the light EV signature table includes a list of EV types and a set of values assigned for the EV type for each of the frequency bands. In a preferred embodiment, character values of "H", "M", and "L" are assigned, as previously described. An example of a Light EV Signature Table is shown below.

TABLE 9

Light EV Signature Table

| EV Type | $LB_1$ | $LB_2$ | $LB_3$ | $LB_4$ | $LB_5$ | $LB_6$ |
|---|---|---|---|---|---|---|
| Police 1 | L | H | L | L | L | H |
| Police 2 | L | H | L | L | L | L |
| Police 3 | H | H | H | H | H | L |
| Fire Rescue 1 | H | L | H | H | H | H |
| Fire Rescue 2 | L | L | L | L | L | H |
| Fire Rescue 3 | M | L | M | M | M | H |
| Ambulance 1 | H | L | H | H | H | M |
| Ambulance 2 | H | M | H | H | H | L |
| Ambulance 3 | H | M | H | H | H | M |

At step 808, the light profile buffer summary is compared to the selected EV signature.

At step 810, the processor determines whether or not each of the values in the light profile buffer summary match the corresponding value in the selected EV signature. If all values match, the method proceeds to step 814. In a preferred embodiment, for a 100% confidence interval all character values must match. In another preferred embodiment, for a 66% confidence interval all but 2 frequency bands match. Other confidence intervals may be used. If any value does not a match, the method proceeds to step 812.

At step 812, the processor determines whether or not every EV signature from the Light EV Signature Table has been compared to the light profile buffer summary. If not, the method returns to step 806. If so, the method proceeds to step 816 and returns a null.

At step 814, when the light profile buffer summary matches an EV signature, the corresponding EV type from the Light EV Signature Table is returned.

Figure 8B:
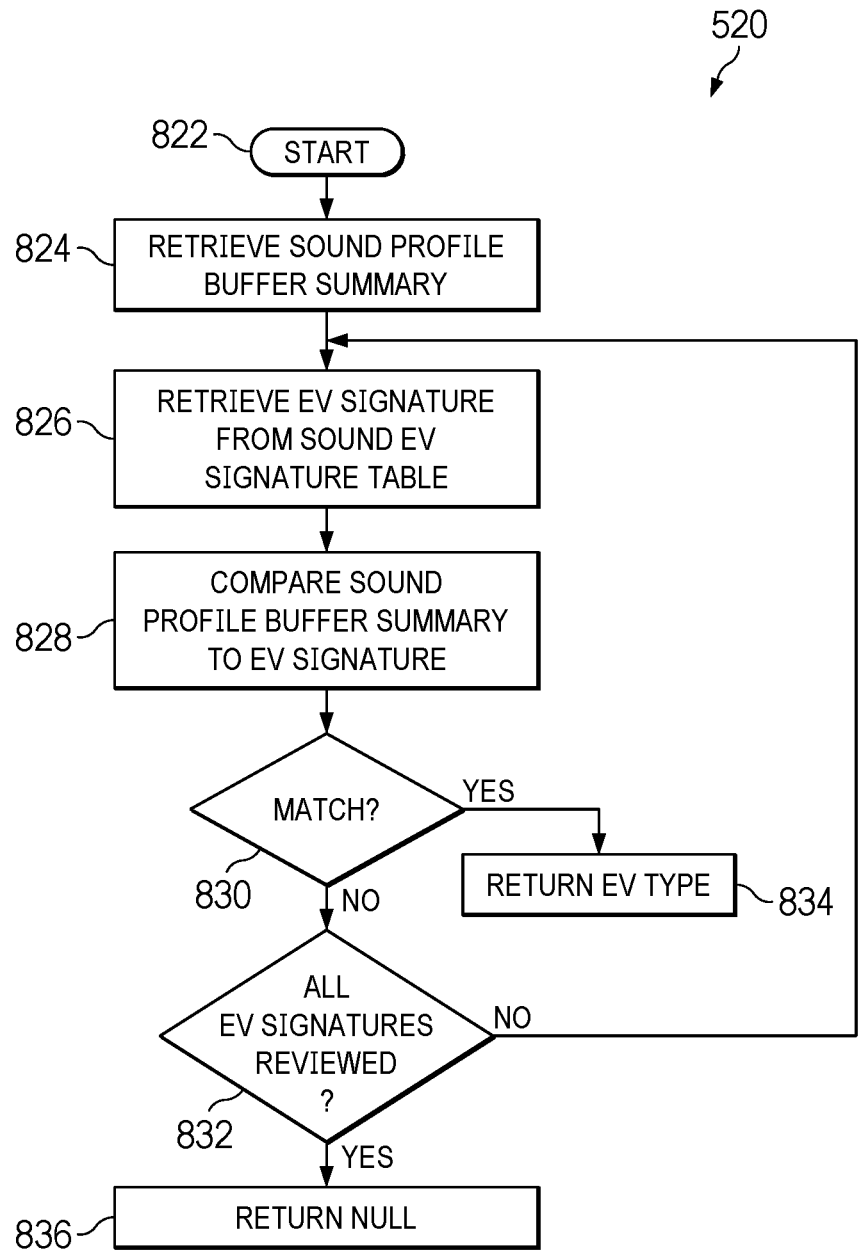
FIG. 8B is a flow chart of a method of identifying an emergency vehicle.

Referring then to FIG. 8B, a preferred method of step 520 will be further described.

In general, determining whether or not an EV is detected requires a comparison of the current sound profile buffer summary to all EV sound signatures stored in memory to find a matching EV type.

At step 822, the method begins.

At step 824, the sound profile buffer summary is retrieved.

At step 826, an EV signature from the sound EV signature table is retrieved. In a preferred embodiment, the sound EV signature table includes a list of EV types, a set of values assigned for the EV type for each of the frequency bands, and a highest frequency value, HFV. In a preferred embodiment, character values of "H", "M", and "L" are assigned, as previously described. An example of a Sound EV Signature Table is shown below.

TABLE 10

Sound EV Signature Table

| EV Type | $SB_1$ | $SB_2$ | $SB_3$ | $SB_4$ | $SB_5$ | $SB_6$ | $SB_7$ | HFV |
|---|---|---|---|---|---|---|---|---|
| Police 1 | L | H | H | M | L | L | L | $HFV_1$ |
| Police 2 | L | M | H | L | L | L | L | $HFV_2$ |
| Police 3 | L | M | M | H | L | L | L | $HFV_3$ |
| Fire Rescue 1 | L | H | M | L | L | L | L | $HFV_4$ |
| Fire Rescue 2 | L | L | L | H | L | L | L | $HFV_5$ |
| Fire Rescue 3 | L | M | L | H | L | L | L | $HFV_6$ |
| Ambulance 1 | L | L | L | H | L | L | L | $HFV_7$ |
| Ambulance 2 | L | H | H | M | L | L | L | $HFV_8$ |
| Ambulance 3 | L | H | M | M | L | L | L | $HFV_9$ |

At step 828, the sound profile buffer summary is compared to the selected EV signature.

At step 830, the processor determines whether or not each of the values in the sound profile buffer summary match the corresponding values in the selected EV signature. In a preferred embodiment, for a 100% confidence interval all character values must match. In another preferred embodiment, for a 66% confidence interval all but 2 frequency bands match. Other confidence intervals may be used. If all values match, the method proceeds to step 834. If all the values do not a match, the method proceeds to step 832.

At step 832, the processor determines whether or not every EV signature from the Sound EV Signature Table has been compared to the sound profile buffer summary. If not, the method returns to step 826. If so, the method proceeds to step 836 and returns a null.

At step 834, when the sound profile buffer summary matches an EV signature, the corresponding EV type from the Sound EV Signature Table is returned.

Figure 9:
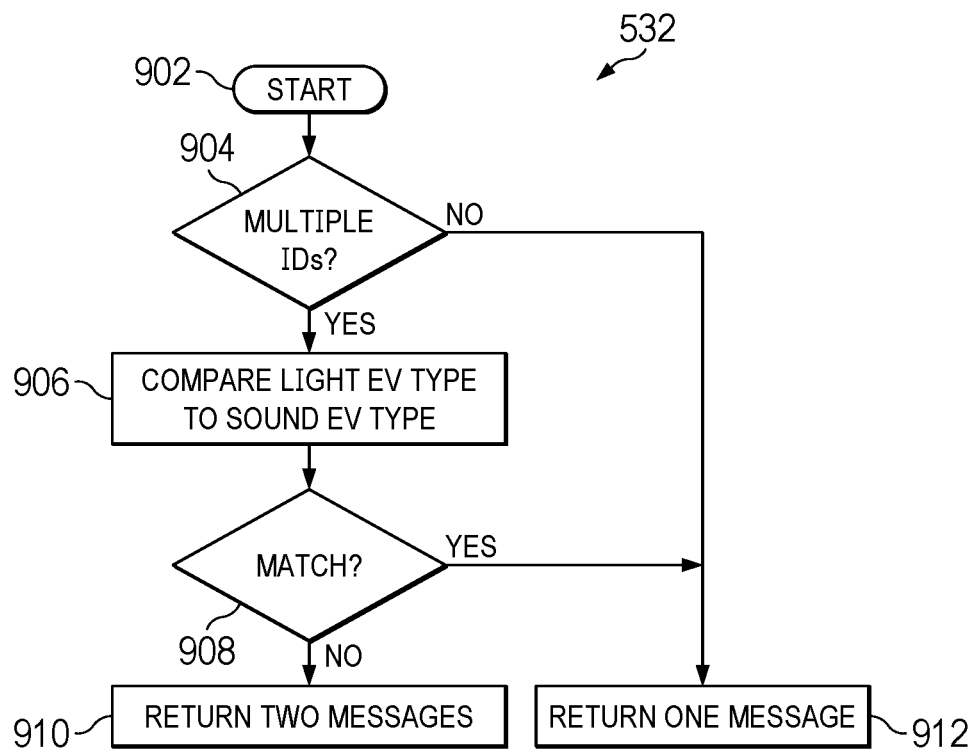
FIG. 9 is a flow chart of a preferred method of generating alerts.

Referring then to FIG. 9, a preferred method of step 532 will be further described.

At step 902, the method begins.

At step 904, the processor determines if there is both a light EV type and a sound EV type are stored in memory. If so, the method proceeds to step 906. If not, the method proceeds to step 912.

At step 906, the light EV type is compared to the sound EV type.

At step 908, the processor determines whether or not the light EV type matches the sound EV type. If so, the method proceeds to step 912. If not, the method proceeds to step 910.

At step 910, alert messages are generated and returned for both the light EV type and the sound EV type. In a preferred embodiment, an alert message includes the type of emergency vehicle approaching. It should be noted that the system may have detected more than one type of EV. If so, the alerts indicate the multiple types of EVs.

At step 912, a single alert message is generated and returned, including the type of emergency vehicle approaching.

Figure 10:
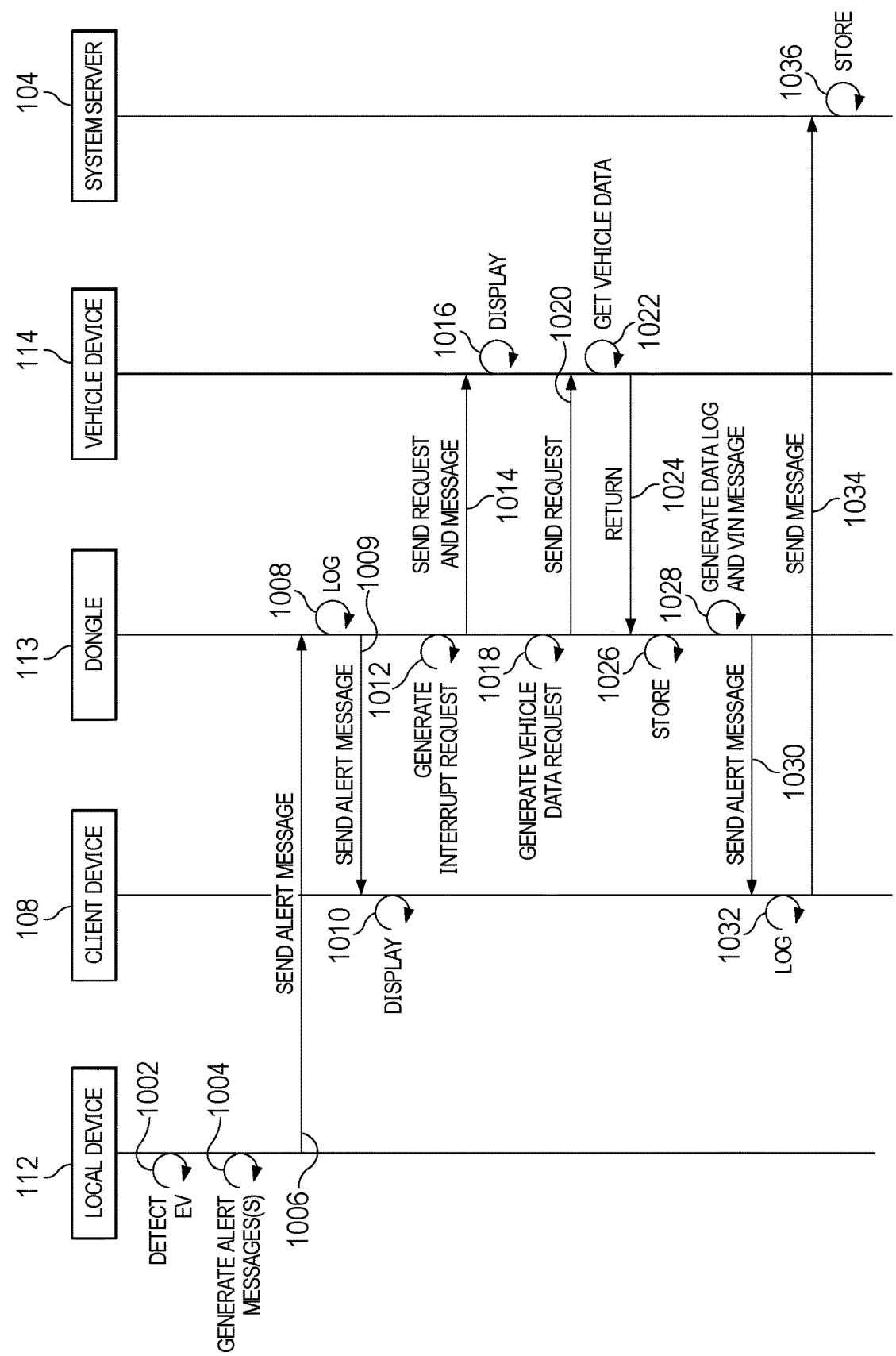
FIG. 10 is a flow chart of a preferred method of transmitting alerts.

Referring then to FIG. 10, a preferred method of step 534 will be further described.

At step 1002, the method begins when an EV is detected.

At step 1004, an alert message is generated at local device 112 for each EV type detected, as previously described. At step 1006, each alert message is transmitted to dongle 113.

At step 1008, processor 230 of the dongle logs the alert message(s) from the local device.

At step 1009, the alert message is transmitted to client device 108. In a preferred embodiment, the alert message is transmitted through Bluetooth. In another embodiment, the alert message is transmitted over Wi-Fi. In yet another embodiment, the alert message may be transmitted via SMS.

At step 1010, the alert message is displayed on client device 108. Static or video messages may be displayed on the client device display. Audio files may be played on the client device as well.

At step 1012, a first CAN Bus interrupt message is generated. The first CAN Bus interrupt message includes the alert message and the instructions needed to connect with the vehicle device and display the alert message(s) on a vehicle display. The message may also include instructions to play audio files.

At step 1014, the first CAN Bus interrupt message is transmitted to the vehicle device.

At step 1016, the alert message is displayed and repeated for predetermined period of time. In a preferred embodiment, the message is displayed between about 15 and 20 seconds. Static or video messages may be displayed. Audio files may be played as well.

At step 1018, a second CAN Bus interrupt message is generated which includes a request for vehicle data. In a preferred embodiment, the vehicle data requested includes vehicle response data, such as speed, brake engagement, turn signal indicator use, and air bag deployment status.

At step 1020, the vehicle data request is transmitted to vehicle device 114.

At step 1022, the vehicle device retrieves the data requested.

At step 1024, the data is returned to the dongle.

At step 1026, the dongle stores the vehicle response data.

At step 1028, the dongle generates a message which includes a data log of vehicle response data received and the vehicle identification number.

At step 1030, the message is transmitted to client device 108.

At step 1032, the client device logs the message.

At step 1034, the message is sent to server 104.

At step 1036, the vehicle response data is stored in the server database.

The invention claimed is:

1. A system for detecting an emergency vehicle comprising:
   a local device, having a first processor of a set of processors and a first memory of a set of memories, operatively connected to a light wave sensor and an acoustic sensor;
   a dongle, having a second processor of the set of processors and a second memory of the set of memories, operatively connected to the local device;
   a vehicle device, having a third processor of the set of processors and a third memory of the set of memories;
   a set of instructions, resident in the set of memories that when executed by the set of processors cause the system to:
      receive a set of light wave signals from the light wave sensor;
      generate a light wave spectral profile from the set of light wave signals;
      generate a light profile buffer from the light wave spectral profile;
      receive a set of sound wave signals from the acoustic sensor;
      generate a sound wave spectral profile from the set of sound wave signals;
      generate a sound profile buffer from the sound wave spectral profile;
      generate a light profile buffer summary from the light profile buffer;
      generate a sound profile buffer summary from the sound profile buffer;
      compare the light profile buffer summary, to a light emergency vehicle signature table, to determine a light emergency vehicle type;
      compare the sound profile buffer summary, to a sound emergency vehicle signature table, to determine a sound emergency vehicle type; and,
      display, on the vehicle device, one of a group of the light emergency vehicle type and the sound emergency vehicle type.

2. The system of claim 1, wherein the light wave spectral profile further comprises a set of light wave maximum amplitude values, indexed by a set of frequency bands.

3. The system of claim 2, wherein the step of generating the light profile buffer further comprises constructing a first in first out table of the set of light wave maximum amplitude values.

4. The system of claim 3, wherein the step of generating the light profile buffer summary further comprises:
   segregating the set of light wave maximum amplitude values into a set of frequency bands;
   summing a subset of the set of light wave maximum amplitude values in each frequency band of the set of frequency bands;
   to calculate a set of amplitude totals; and,
   segregating the set of amplitude totals according to a set of cutoff values.

5. The system of claim 4, wherein the step of comparing the light profile buffer summary further comprises determining the light emergency vehicle type within a predetermined confidence interval.

6. The system of claim 2, wherein the set of frequency bands further comprises at least a 450 nm band, a 500 nm band, a 550 nm band, a 570 nm band, a 600 nm band and a 650 nm band.

7. The system of claim 1, wherein the sound wave spectral profile further comprises a set of sound wave maximum amplitude values, indexed by a set of frequency bands.

8. The system of claim 7, wherein the step of generating the sound profile buffer further comprises constructing a first in first out table of the set of sound wave maximum amplitude values.

9. The system of claim 8, wherein the step of generating the sound profile buffer summary further comprises:
   segregating the set of sound wave maximum amplitude values into a set of frequency bands;
   summing a subset of a set of soundwave maximum amplitude values in each frequency band of the set of frequency bands to calculate a set of amplitude totals; and,
   segregating the set of amplitude totals according to a set of cutoff values.

10. The system of claim 9, wherein the step of comparing the sound profile buffer summary further comprises determining the sound emergency vehicle type within a predetermined confidence interval.

11. The system of claim 4, wherein the set of frequency bands further comprises at least a 63 Hz band, a 160 Hz band, a 400 Hz band, a 1 kHz band, a 2.5 kHz band, a 6.25 kHz band, and a 16 kHz band.

12. The system of claim 1, wherein the sound profile buffer further comprises:
   a first maximum frequency value;
   the sound emergency vehicle signature table further comprises a second maximum frequency value; and,
   the set of instructions further comprises instructions that when executed cause the system to:
      compare the first maximum frequency value to the second maximum frequency value to derive a comparison condition; and,
      send an alert message to the vehicle device based on the comparison condition.

13. The system of claim 12, further comprising:
   a client device, operatively connected to the dongle; and,
   wherein the set of instructions include further instructions that when executed cause the system to:
      display, on the client device, one of a group of the light emergency vehicle type, the sound emergency vehicle type and the alert message.

14. The system of claim 13, further comprising:
a server, operatively connected to the client device; and,
wherein the set of instructions include further instructions that when executed cause the steps of:
- retrieve a set of vehicle conditions from the vehicle device upon one of a group of determining the light emergency vehicle type and determining the sound emergency vehicle type; and,
- send the set of vehicle conditions to the server.

15. A method for detecting an emergency vehicle comprising:
providing a local device, having a first processor of a set of processors and a first memory of a set of memories, operatively connected to a light wave sensor and an acoustic sensor;
providing a dongle, having a second processor of the set of processors and a second memory of the set of memories, operatively connected to a local drive;
providing a vehicle device, having a third processor of the set of processors and a third memory of the set of memories;
providing a set of instructions, resident in the set of memories that when executed by the set of processors cause the steps of:
- receiving a set of light wave signals;
- generating a light wave spectral profile from the set of light wave signals;
- generating a light profile buffer from the light wave spectral profile;
- receiving a set of sound wave signals;
- generating a sound wave spectral profile from the set of sound wave signals;
- generating a sound profile buffer from the sound wave spectral profile;
- generating a light profile buffer summary from the light profile buffer;
- generating a sound profile buffer summary from the sound profile buffer;
- comparing the light profile buffer summary to a light emergency vehicle signature table to determine a light emergency vehicle type;
- comparing the sound profile buffer summary to a sound emergency vehicle signature table to determine a sound emergency vehicle type; and,
- displaying, on the vehicle device, one of the group of the light emergency vehicle type and the sound emergency vehicle type.

16. The method of claim 15, wherein the step of generating the light wave spectral profile further comprises storing a set of light wave maximum amplitude values indexed by a set of frequency bands.

17. The method of claim 16, further comprising the step of providing the set of frequency bands as at least a 450 nm band, a 500 nm band, a 550 nm band, a 570 nm band, a 600 nm band and a 650 nm band.

18. The method of claim 15, wherein the step of generating the sound wave spectral profile further comprises storing a set of sound wave maximum amplitude values is indexed by a set of frequency bands.

19. The method of claim 18, further comprising the step of providing the set of frequency bands as at least a 63 Hz band, an 160 Hz band, a 400 Hz band, a 1 kHz band, a 2.5 kHz band, a 6.25 kHz band, and a 16 kHz band.

20. The method of claim 15, wherein the step of generating the light profile buffer further comprises constructing a first in first out table of a set of light wave spectral profiles including the light wave spectral profile.

21. The method of claim 20, wherein the step of generating the light profile buffer summary further comprises:
bands;
segregating the first in first out table into a set of ranges, according to a set of frequency
summing the set of ranges into a set of totals; and,
characterizing the set of totals according to a set of cutoff values.

22. The method of claim 21, wherein the step of comparing the light profile buffer summary further comprises determining the light emergency vehicle type within a predetermined confidence interval.

23. The method of claim 15, wherein the step of generating the sound profile buffer further comprises constructing a first in first out table of a set of sound wave spectral profiles including the sound wave spectral profile.

24. The method of claim 23, wherein the step of generating the sound profile buffer summary further comprises:
segregating the first in first out table into a set of ranges, according to a set of frequency bands;
summing a set of ranges into a set of totals; and,
characterizing the set of totals according to a set of cutoff values.

25. The method of claim 15, wherein the step of comparing the sound profile buffer summary further comprises determining the sound emergency vehicle type within a predetermined confidence interval.

26. The method of claim 15, further comprising:
providing the sound profile buffer as a first maximum frequency value;
providing the sound emergency vehicle signature table with a second maximum frequency value; and,
providing further instructions in the set of instructions, that when executed cause the steps of:
- comparing the first maximum frequency value to the second maximum frequency value to derive a comparison condition; and,
- sending an alert message to the vehicle device based on the comparison condition.

27. The method of claim 26, further comprising:
providing a client device, operatively connected to the dongle; and,
providing further instructions in the set of instructions, that when executed cause the steps of:
- displaying, on the client device, one of a group of the light emergency vehicle type, the sound emergency vehicle type and the alert message.

28. The method of claim 27, further comprising:
providing a server, operatively connected to the client device; and,
providing further instructions in the set of instructions, that when executed cause the steps of:
- retrieving a set of vehicle conditions from the vehicle device upon one of a group of determining the light emergency vehicle type and determining the sound emergency vehicle type; and,
- send the set of vehicle conditions to the server.

* * * * *